United States Patent [19]

Neumann

[11] 4,201,308

[45] May 6, 1980

[54] WATER-BASED CONTAINER END SEALING COMPOSITIONS AND THEIR USE

[75] Inventor: Daniel L. Neumann, Waukegan, Ill.

[73] Assignee: The Dexter Corporation, Windsor Locks, Conn.

[21] Appl. No.: 867,617

[22] Filed: Jan. 6, 1978

Related U.S. Application Data

[62] Division of Ser. No. 785,332, Apr. 7, 1977, Pat. No. 4,138,384.

[51] Int. Cl.$^2$ .............................................. B65D 53/06
[52] U.S. Cl. ........................... 220/81 R; 260/29.7 D; 260/29.7 S; 260/29.7 M; 260/29.7 B; 260/42.47
[58] Field of Search .......... 260/42.47, 29.7 D, 29.7 S, 260/29.7 M, 29.7 B; 220/67, 81 R

[56] References Cited

U.S. PATENT DOCUMENTS

| | | | |
|---|---|---|---|
| 2,672,454 | 3/1954 | Rother et al. | 260/29.7 S |
| 2,799,662 | 7/1957 | Ernst et al. | 260/29.7 S |
| 2,905,649 | 9/1959 | Craig et al. | 260/29.7 B |
| 3,015,638 | 1/1962 | Sergi | 260/29.7 S |
| 3,079,359 | 2/1963 | Stierli | 260/29.7 D |
| 3,125,459 | 3/1964 | Foye | 427/238 |
| 3,950,280 | 4/1976 | Singleton | 260/894 |
| 3,959,206 | 5/1976 | Singleton | 260/29.6 W |
| 3,986,629 | 10/1976 | Singleton | 220/81 R |

*Primary Examiner*—Lewis T. Jacobs
*Attorney, Agent, or Firm*—Merriam, Marshall & Bicknell

[57] ABSTRACT

Improved aqueous or water-based sealant compositions adapted for use as container end sealants are disclosed, which have a relatively high total solids content, are substantially or entirely free of volatile organic solvents, have thixotropic characteristics prior to setting, are settable under air-drying conditions, at ambient temperatures and within requisite periods of time, and are essentially based upon a particular combination of synthetic, elastomeric, high molecular weight polymer components generally provided by or from separate latex forms thereof, and a thixotropic, mineral flow control agent which imparts desirable thixotropic characteristics to the water-based sealants and also serves as a thickener and filler for the sealant and as an extender for the elastomeric polymers thereof, all in an aqueous, stable and uniform form. Furthermore, the use of those water-based sealant compositions, after setting, in sealing container ends in place, and the resultant hermetically sealed containers are disclosed.

14 Claims, 3 Drawing Figures

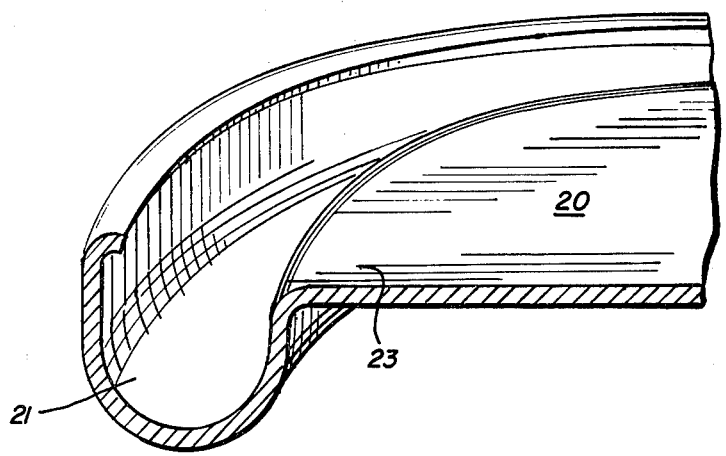
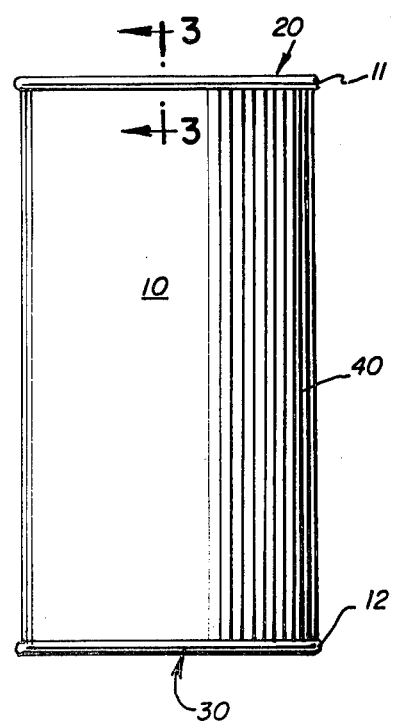
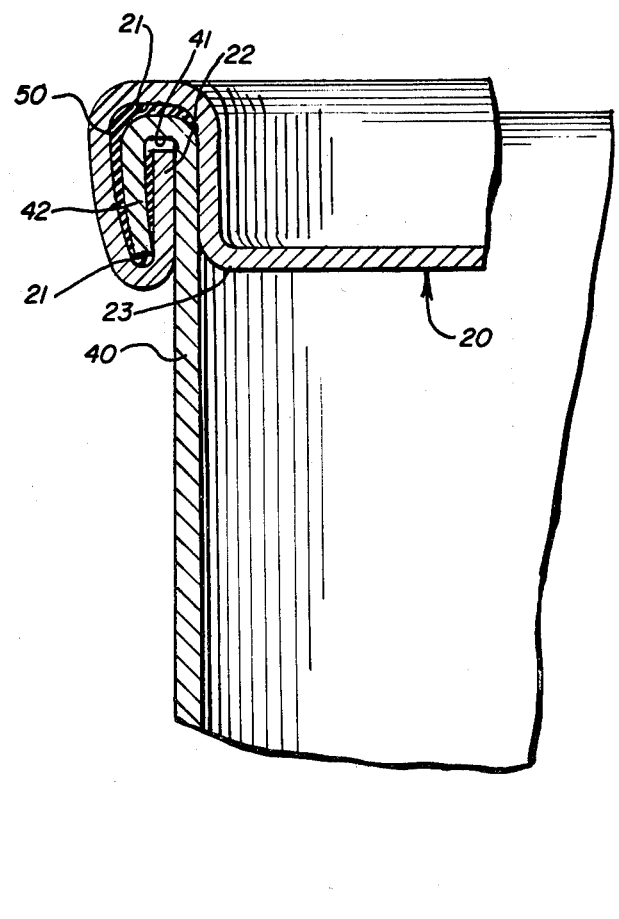

WATER-BASED CONTAINER END SEALING COMPOSITIONS AND THEIR USE

This is a division of application Ser. No. 785,332, filed Apr. 7, 1977, now U.S. Pat. No. 4,138,384, issued Feb. 6, 1979.

This invention relates to:

(a) improved aqueous or water-based sealant compositions which are adapted for use in sealing a container end to a container body portion, and which are characterized by (i) having a relatively high level of total solids, (ii) being substantially, virtually or entirely free of volatile organic solvents, (iii) having desirable thixotropic properties, and (iv) being capable of undergoing setting to a substantially solidified or relatively hardened state under air-drying conditions, and at ambient temperatures, and within requisite periods of time without sagging or slumping, and without developing undesirable or substantial void spaces, or structural blemishes or flaws during setting; and, (b) containers having connected ends hermetically sealed in place with set, adherent sealant compositions provided by said aqueous or water-based sealant compositions.

The term "containers," as used herein and unless otherwise indicated, includes, but is not limited to, cans.

The attachment of can ends to cylindrical or tubular body portions of 3-piece cans or drawn and ironed 2-piece cans is well known in the art and commonly involves a double seaming operation which deforms a set or cured sealant annularly disposed within the resultant seams in sealing relationship therein.

Before attaching the can ends in place, a liquid sealant generally is dispensed or discharged as an essentially non-aerated stream from a fixed nozzle (e.g., nozzle of airless spraying apparatus) into pre-formed, flanged, peripheral trough-like grooves of spinning can ends. The liquid sealant so distributed on the periphery of the end portions is allowed to set or cure to a substantially solidified or relatively hardened, but deformable, state, which requires substantially drying the sealant or removing volatiles therefrom, or providing a change in temperature. During setting or curing, the can ends, with the sealant in place, may be subjected to handling, stacking, or temporary storage.

After a substantial amount of volatiles has been removed to set or cure the sealant (within 48 hours), a can end is positioned at an end of the cylindrical body portion and the curled or flanged peripheral edge of the can end is further curled and clamped to the peripheral end edge of the body. More particularly, an end edge of a can body is positioned in the body-receiving peripheral groove of the can end and in contact with the set or cured sealant therein, and the peripheral groove of the can end is progressively closed in clamped, interlocking or interfolded relationship about the end of the body by applying mechanical pressure, thereby also causing the sealant to undergo pressure-induced plastic flow and to deform within the clamped joint or seam in sealing contact therewith. As a result, the joint or seam is sealed, but for varying periods of time.

The types of liquid sealants generally used in sealing containers or can ends in place may be characterized as being (1) volatile organic solvent-based sealants or (2) water-based sealants.

Such volatile organic solvent-based sealants may have a high level of total solids and have, for example, in the vicinity of about 60% by weight of volatile organic solvents and about 40% by weight of total solids, and may set or cure at ambient temperatures; however, such sealants suffer from, among other things, having a significant or substantial amount of volatile organic solvents, whereby a large volume of those solvents evaporate or volatilize from the sealants during setting or curing, and consequently cause undesirable pollution of the surrounding atmosphere, as well as added health and fire hazards.

Container or can ends peripherally lined with such water-based sealants often have or are subjected to a separate or special drying operation (e.g., oven-drying) to remove water and to effect setting, or have no more than about 65%, and, in certain instances, perhaps as much as about 70% by weight of total solids, do not maintain a hermetic seal satisfactorily, or have other undesirable limitations.

In accordance with the present invention, aqueous or water-based sealant compositions are provided which are substantially, virtually or entirely free of objectionable or flammable organic solvents (e.g., more than 80% by volume of the total solvent or liquid vehicle content is water), and do not require oven-drying. The liquid sealant compositions, although being water-based or water-borne sealants, have a sufficiently high level of solids to be capable of setting effectively, on a production basis, under air-drying conditions, even within the setting time associated with air-drying, solvent-based sealants (e.g., up to but not more than two days).

Furthermore, my liquid sealant compositions have desirable thixotropic characteristics, which enable them to be effectively dispensed or ejected, on a production basis, from the nozzle of conventional dispensing equipment (e.g., automatic, high speed, extrusion-spraying or sealant lining machines) under desirably controlled conditions onto the periphery of container ends and, thereafter, to stay in place on the container ends and not sag or slump during setting.

In addition, it has been found that after aqueous-based sealant compositions of the invention have been uniformly metered onto the periphery of container ends to provide precise sealant weight and placement control, those lined ends may be handled, stacked or stored during setting without having objectionable physical flaws or blemishes (e.g., blisters, pin holes, pitting, cracks, macro-cells, voids or bubbles) form or develop therein, to provide a continuous, uniform sealing film; whereas it has been found that after other air-dryable, water-based sealants have been dispensed onto container ends and those ends are thereafter handled, stacked or stored during setting, objectionable physical defects or blemishes (e.g., blistering or the formation of pin holes, pitting, cracks, macro-cells, voids or bubbles) tend to develop therein, which result in the formation of objectionable, non-uniform or irregular sealant films. Still further, the set sealants of the invention, which are the coherent and adherent residue from the setting or drying of the water-based sealants, have outstanding, if not superior, structural uniformity and sealing characteristics, even when used in making containers for a wide variety of food products, including sanitary, beverage and beer cans.

Briefly, the aqueous or water-based sealant compositions of the present invention: are air-dryable or settable without requiring being heated or dried in an oven, and are sufficiently high in solids as to be settable at ambient temperatures within requisite periods of time (within 48 hours or less); are substantially virtually or entirely free of volatile, flammable or objectionable organic solvents; are stable (when appropriately stored and used); are homogeneous (when appropriately stored and used); are thixotropic; are capable of being readily applied with conventional equipment to container ends; and, may be used to hermetically seal container ends firmly in place for extended periods of time.

The pH of those water-based sealants must be such that the compositions are thixotropic and of desired thickness, and the synthetic, elastomeric, high molecular weight polymer components therein (e.g. provided by latex components) are stable (do not separate into distinct phases) under appropriate storage conditions. The pH of the water-based sealants generally is on the basic side, but may be within the range of about 7 to 10, and preferably should be within the range of about 8 to 9.

Conventional airless spray systems may be used to discharge or dispense the water-based sealant compositions of the invention in the form of a controllable stream onto the periphery of container ends without atomizing or aerating the sealant. Such spraying systems generally include a reservoir or holding tank with the water-based sealant of the invention; the sealant may or may not be retained therein under a head of gas pressure. The sealant flows from the reservoir through a connecting hose or pipe and may be subjected to added hydraulic pressure by means of a gear pump. The sealant ultimately flows through the hose or pipe to a discharge nozzle having a small discharge orifice. The orifice may be selectively opened or closed by means of a reciprocating needle valve or the like. Finally, the sealant is discharged from the nozzle in a controllable manner, as a stream instead of in an atomized form, onto the spinning periphery or peripheral groove of container ends. During usage, a considerable amount of mixing commonly occurs within the nozzle.

The set, homogeneous, coherent, adherent sealants of the invention have outstanding structural and sealing characteristics, and metal or paper (e.g., cardboard) containers having ends appropriately sealed-in-place therewith have enhanced processing and storage stability or shelf-life. For example, when the set sealant is used to seal the end of a food can, the sealant has good adhesion properties, maintains an effective hermetic seal which has resistance to solubilization by edible fats and oils and to penetration by air and water, is free of voids spaces or flaws which destroy the desired imperviousness of the seal, and has resistance to heat, so that the can (e.g., sanitary can) may be sterilized with steam and/or the packaged product may be subjected to thermal heat processing.

The term "set," as used herein and unless otherwise indicated, refers to the ability of sealing compositions to solidify to a relatively or substantially hardened, but pressure-deformable, state by the substantial removal of volatiles and by using the appropriate setting conditions, so that a container end may be positioned at and connected to an end of a container body in good adhering and sealing relationship thereto. The water-based sealants of the invention are capable of setting within 48 hours by being subjected to air-drying at ambient temperatures, and generally are dry to the touch within about 15 to 20 minutes.

In using my aqueous-based sealing compositions, the time (e.g., drying time) for such compositions to set, without oven-drying, varies, depending upon a variety of factors, including the particular formulation of the sealing composition, and the humidity, air currents and the ambient temperatures in the immediate setting environment. Drying or setting may be accelerated, for example, by providing hot air currents. The drying or setting time may be adjusted to meet the particular needs of the user.

The term "ambient temperatures," as used herein and unless otherwise indicated, relates to temperatures of the order of about 60° to 95° F., which are temperatures at which the aqueous-based sealant compositions of the invention usually would be subjected to during application to a container end and up to a few days (e.g., two days or less) after being so-applied, or until such sealants have set.

The water-based sealants advantageously have a high level of total solids and desirable thixotropic flow characteristics, and sometimes may be referred to as being in the form of a "liquid," in that they flow when applied to container ends and prior to setting, although they should not undergo substantial or undesired deformation (e.g., sagging) or flow while setting.

More specifically, the water-based sealants of the invention generally contain at least or more than 65% by weight of total solids and may contain as much as, for example, 72.5% by weight of total solids, preferably at least 67% by weight of total solids and as much as, for example, 70% by weight of total solids. Substantially or virtually all, or the entire amount, of the liquid volatile material is available water, and most, if not virtually all, of the available water volatilizes during setting.

The term "latex," as used herein and unless otherwise indicated, refers to an aqueous system wherein the solids therein essentially consist of a synthetic, elastomeric, high molecular weight polymer component, which are distributed or dispersed therein in the form of a dispersion or emulsion.

The settable, stable, thixotropic, aqueous or water-based sealant compositions of the invention essentially consist of (a) acrylonitrile latex component having a synthetic, elastomeric, high molecular weight, acrylonitrile polymer component, such as acrylonitrile-butadiene copolymer, (b) butyl latex component having a synthetic, elastomeric, high molecular weight, isobutylene polymer component, such as isobutylene-isoprene copolymer, (c) compatible, thixotropic, mineral flow control agent, and (d) available water [incorporated into the sealant with the latex components, and, if necessary or desired, some water may be separately added (e.g., distilled or UV-treated, deionized water)]. Components (a) to (c), inclusive, are distributed or dispersed substantially throughout the aqueous vehicle or component (d). In order to provide a water-based sealant that resists bacterial attack during shipping and storage and/or becoming unstable or non-homogeneous as a result of bacterial growth, it is important to also include effective levels of a bactericide therein, such as paraformaldehyde.

The water-based sealants may be stored in drums or cans, and are substantially uniform, liquid blends or admixtures that may be readily poured therefrom, as desired or needed, and when taken from an appropriately sealed storage container or used, should have a Brookfield viscosity in the vicinity of about 2,800 to 12,000 cps., preferably in the vicinity of about 6,000 to 10,000 cps. (LVF-5X, #3 spindle at 12 rpm. and 70° F.).

The aqueous sealants of the invention are "stable" in that they may be stored for at least 3 months, preferably at least 6 months, before being used; and, the resultant ready-for-use aqueous sealants are homogeneous or uniform and without phase separation substantially throughout, although in some instances some mixing or agitation may be desirable or necessary to assure or attain such homogeneity or uniformity. Accordingly, the term(s) "stable" and/or "homogeneous," as used herein in referring to the water-based sealants and unless otherwise indicated, refer to those characteristics.

After setting, the elastomeric sealant is homogeneous and, although of a solid, normally shape-retaining form, undergoes plastic flow and deformation when subjected to the substantial mechanical pressure conditions generally used when the container end, with the set sealant in place, is connected to the body portion by a seaming operation.

In the accompanying illustrative diagrammatic drawings:

FIG. 1 is an enlarged perspective sectional view of an inverted conventional metal (e.g., steel or aluminum) can end having a continuous peripheral groove or channel;

FIG. 2 is a side elevational view of a 3-piece metal can with similar end members (see FIG. 1), each of which end members is connected to one of the opposed ends of a body member by a conventional double seam and is hermetically sealed therein by means of the set sealant composition of the invention, which is sealably disposed within the double seam; and, FIG. 3 is an enlarged vertical sectional view taken substantially along the line 3—3 of FIG. 2 and showing the top end of the can connected to the body member and hermetically sealed thereto.

The liquid, settable, water-based sealant composition is uniformly deposited or sprayed in a metered amount onto the flanged peripheral grooves or channels of spinning can ends from a fixed nozzle in the form of a substantially non-aerated stream. Generally, a sufficient amount of sealant is precisely deposited in the groove to reach a level below, but in close proximity to, the level of the adjoining, inwardly positioned shoulder or high rise portion.

Referring to FIG. 1, a conventional can end 20 is shown (in inverted position) having a continuous, U-shaped peripheral groove or channel 21 with an adjoining curled peripheral end flange. A shoulder or high rise 23 is connected to the groove 21.

In FIG. 2, an illustrative conventional 3-piece metal can 10 is shown with similarly constructed, top and bottom end members 20 and 30, respectively, connected to the top and bottom ends of a tubular or cylindrical body member 40 by means of conventional double seams 11 and 12, respectively. The double seaming operation used to form the double seams, deforms and fully incorporates the set sealant within the interlocking or interfolded, hermetic joints provided by the double seams 11 and 12.

The top and bottom ends or end edges of the body 40 have similarly constructed, continuous, opposed, U-shaped peripheral grooves or channels, each of which has a peripheral end flange. After the sealant has set in the peripheral grooves or channels of the top and bottom can ends 20 and 30, the peripheral end flanges of the body 40 are positioned in the body-receiving grooves of the can ends 20 and 30 in contact with the set sealant. The curled peripheral flanges of the can ends are progressively interfolded and clamped to the channels of the body by a conventional double seaming operation (e.g., with seaming rollers). During the seaming operation, considerable mechanical pressure is exerted on the joints and the set, pressure-shapeable sealant is squeezed substantially throughout the seams, thereby retaining and incorporating it in completed, continuous hermetic joints (as shown in FIG. 3).

FIG. 3 illustrates the sealed, top double seam 11 by showing the top end 20 of the can 10 sealably secured to the body 40. More particularly, FIG. 3 shows the interfolded, curled peripheral end flange 22 and U-shaped groove or channel 21 of the top end 20 interconnected with the U-shaped groove or channel 41 and peripheral flange 42 of the top end of the body 40, and the sealing relationship of the sealant 50 with respect to the resultant double seam. The bottom of the can is secured and sealed to the bottom end of the body in a similar manner.

The acrylonitrile latex component essentially consists of a synthetic, elastomeric, high molecular weight, acrylonitrile polymer component, such as acrylonitrile-butadiene copolymer (NBR) having a predominance of butadiene (e.g., 25 to 35% by weight of acrylonitrile and 75 to 65% by weight of butadiene), in an aqueous medium.

The acrylonitrile polymer component imparts tacky or adhesive properties, toughness and good oil resistance to the set sealant. Furthermore, the acrylonitrile polymer component imparts to the set sealant good barrier properties with respect to air, water, oils, greases and a variety of chemicals. Still further, it imparts desired internal cohesiveness or cohesive strength to the isobutylene polymer component. However, the acrylonitrile polymer component generally tends to be too hard and too brittle and to lack desired flexibility unless blended or admixed with the isobutylene polymer component.

Outstanding results have been provided with acrylonitrile latex components or products known as "Hycar" 1562X155 Latex and 1562X117 Latex, products of B. F. Goodrich Chemical Company, which are high molecular weight, medium acrylonitrile, acrylonitrile-butadiene copolymer products (NBR) formed by emulsion polymerization. Those latex products are in the form of stable aqueous dispersions.

The composition of "Hycar" 1562X115 Latex corresponds with that of "Hycar" 1562X117 Latex, except that it does not include an antioxidant (solid), which is present in the typical latter product as about 1% by weight solids. Since the type of antioxidant present in "Hycar" 1562X117 Latex has not been approved as of food grade-type by the Food and Drug Administration, the antioxidant-free "Hycar" 1562X155 Latex product should be used in container end sealants for containers for food products (e.g., sanitary, or beer and beverage cans).

The copolymer present in "Hycar" 1562X155 Latex typically has 30 to 35% by weight of acrylonitrile and 70 to 65% by weight of butadiene, and a molecular weight of greater than about 1,000,000. "Hycar" 1562X155 Latex is provided in an aqueous form typically having 41% by weight of total solids, 38 to 39% by weight of acrylonitrile-butadiene copolymer, 2 to 3% by weight of other solids (i.e., solids other than the copolymer solids), and 59% by weight of water. The typical characteristics or properties of "Hycar" 1562X155 Latex essentially are the same as those of "Hycar" 1562X117 Latex, except for the presence of about 1% by weight of a non-staining antioxidant in the latter product, and are summarized below in tabulated form:

Emulsifier: Fatty acid
Antioxidant: None
Latex (lbs./gal.): 8.2
Latex Specific Gravity: 0.99
Latex Solids (lbs./gal.): 3.4
Latex Solids Specific Gravity: 0.98
Total Solids (%): 41
Water (%): 59
pH: 10
Relative Particle Size: Small
Surface Tension (dynes/cm.): 48
Brookfield Viscosity (cps.): 20
Copolymer Mooney Viscosity (ML-4 at 212° F.): 100 MS
pH Stability: 9–11

The butyl latex component essentially consists of a synthetic, elastomeric, high molecular weight, isobutylene polymer component, such as isobutylene-isoprene copolymer having a predominance of butylene (e.g., about 1.8 to 2.3% by weight of isoprene and about 98.2 to 97.7% by weight of isobutylene), in an aqueous medium.

The isobutylene polymer component has good flexibility, adhesiveness and barrier characteristics. It imparts to the set sealant good mechanical and chemical stability, good flexibility, good resistance to aging, heat, oxygen, ozone and grease, and good resistance to the permeation of moisture and gases. The isobutylene polymer component overcomes the excessively hard and brittle characteristics and insufficient flexibility generally associated with the acrylonitrile polymer component. However, the isobutylene polymer component generally tends not to have desired internal cohesiveness or cohesive strength unless the butyl latex component is blended or admixed with the acrylonitrile latex component, so as to provide an appropriate admixture of the acrylonitrile polymer component and isobutylene polymer component in the sealant.

Outstanding results have been achieved with a butyl latex component known as "Exxon" Butyl Latex 100, a product of Exxon Chemical Company U.S.A., which is a high molecular weight, aqueous anionic emulsion of "Exxon" Butyl rubber (BR), to which about 400 ppm. of formaldehyde has been added (to the latex) as a preservative. "Exxon" Butyl rubber is an isobutylene-isoprene copolymer typically with 2.1% by weight of isoprene and typically resulting in about 1.5 mol percent unsaturation, and typically is formed by solution polymerization. "Exxon" Butyl Latex 100 is provided in the form of a stable, anionic aqueous emulsion (or finely divided dispersion) typically having 61 to 65% by weight of total solids consisting of isobutylene-isoprene copolymer, and having 39 to 35% by weight of water. The typical characteristics or properties of "Exxon" Butyl Latex 100 are summarized below in tabulated form:

Color: White
Total Solids (%): 61–65
Specific Gravity: 0.95
Density (lbs./gallon): 8.0
Water (%): 35–39
pH (by grass electrode): 4.5–6.5
Particle Size
  Average (microns): 0.3
  Range (microns): 0.1–0.8 (95%)
Surface Tension (dynes/cm. at 70° F.): 38
Odor: None; but a very slight formaldehyde odor may be detected.
Brookfield Viscosity (LVT, #3 spindle at 12 rpm.; cps.): 3500
Copolymer Mooney Viscosity (ML 1+3 at 260° F.): 50–60 Copolymer Staudinger Viscosity: 450,000
Film Tensile Strength (psi.): 35
Copolymer Unsaturation (mol %): 1.5
pH Stability: 4–11

The flow control agent which is present or incorporated in the water-based sealant is a compatible, particulate thixotropic extender essentially consisting of small (e.g., finely divided), uniformly dispersible, mineral particles which are essentially inert and insoluble under normal conditions of use. The small particles of thixotropic flow control agent impart important thickening and thixotropy (thixotropic flow characteristics) to the water-based sealant, thereby facilitating the effective application and use of the water-based sealant. More particularly, it provides effective means for controlling the flow characteristics of the water-based sealant, thereby facilitating its application to container ends, and, after being so deposited on container ends, provides a thixotropic sealant having sufficient thickness, body or viscosity to stay in place and not sag or slump (i.e., resistance to sag or anti-sag) during setting.

The flow control agent obviates the need for using a special or separate, non-thixotropic thickening agent (e.g., thickener containing a neutralized salt of acrylic or methacrylic acid, or esters of acrylic or methacrylic acid with alcohols) and/or filler, but acts much more than as a mere filler or thickener.

It is important that the flow control agent be compatible with the latex components and not destroy the desired physical stability of the latices (e.g., avoid or resist agglomeration of the latex components) and not chemically react therewith in an undesirable or significant manner.

It has been found that particularly effective results are achieved with fine aluminum silicate particles or siliceous pigment in the form of small hydrous clay particles (e.g., water-washed, non-hygroscopic, particulate kaolin clay).

To impart the desired thixotropic properties to the water-based sealant and uniformly and intimately distribute or disperse the thixotropic clay or aluminum silicate particles therein, it is important that the particles be of a small, controlled size and, more particularly, have a particle size (e.g., nominal or apparent diameter) of at most or up to about 20 microns, preferably at most or up to about 10 microns, and/or that the average particle size be up to or at most about 1 micron, preferably up to or at most about 0.6 micron.

Moreover, the pH of the thixotropic, mineral flow control agent (e.g., thixotropic clay) is important, since there usually is an important relationship between its pH and the thixotropic or thickening properties desired for the water-based sealant and the resultant stability of both the acrylonitrile and butyl latex components. For most purposes, the pH of the water-based sealant should be in the vicinity of about 7 to 10, and preferably should be in the vicinity of about 8 to 9. For example, the pH of the thixotropic clay should be adjusted if it is necessary to adjust or assure such pH control of the water-based sealant. The pH of the thixotropic, mineral flow control agent (e.g., clay) may be increased by pretreating either or both aqueous latex components, for example, with ammonium hydroxide solution before adding the flow control agent, so that the pH of the flow control agent likewise is increased upon being added thereto.

Particularly outstanding results (e.g., thixotropy, thickening and stability) are provided by water-washed kaolin clay which has been pretreated to form a deflocculated suspension of high fluidity in water vehicles, such as "ASP" 102 of Engelhard Minerals & Chemical Corporation. "ASP" 102 essentially consists of small, particulate siliceous solids in the form of hydrous, complex aluminum silicate.

The typical properties of "ASP" 102 are as follows:
  Particle Shape: Thin flat plates
  Average Particle Size (microns): 0.55
  Residue 325-Mesh (Max. %): 0.01
  Oil Absorption (ASTM DZ81-31): 37–41
  Color (G.E. Brightness): 86.5–88
  Refractive Index: 1.56
  Specific Gravity: 2.58
  pH: 6.3–7.0
  Bulking Value
    lbs./gal.: 21.5
    gals./lb.: 0.047
  Bulk Density
    Loose (lbs./ft.$^3$): 45–50
    Firm (lbs./ft.$^3$): 55–57
  Free Moisture (Max. %): 1.0

Although particulate, thixotropic flow control agents other than thixotropic hydrous clay or thixotropic, hydrous, aluminum silicate pigment, such as fumed silica (e.g., "Cab-O-Sil" M-5 of the Cabot Corporation), may be used effectively and in varying, but controlled, minor amounts in admixture with major amounts of the thixotropic clay or aluminum silicate pigment, the use of thixotropic clay generally is preferred because of its particular thixotropic characteristics, lower cost and good dependability. For example, the thixotropic flow control agent may have up to 20 to 30% by weight of fumed silica (preferably up to 10 to 15% by weight of fumed silica), the remainder being thixotropic clay or aluminum silicate. Furthermore, the clay or aluminum silicate particles generally have a less acidic or higher pH than fumed silica.

Fumed silica, such as "Cab-O-Sil" M-5 of the Cabot Corporation, has an extremely small particle size and enormous surface area and is produced by the hydrolysis of silicon tetrachloride vapor in a flame of hydrogen and oxygen (referred to as "fumed" silica because of its smoke-like appearance as it forms in the flame), has white, non-porous, chain-like aggregates (maximum length o a few tenths of a micron) consisting of fused spherical primary particles of pure silica, and typically has a surface area of 200 ($\pm$25) meters$^2$/gm. [determined by nitrogen adsorption assuming spherical particles, J. Am. Chem. Soc., 60, 309 (1938)], residue on a 325-mesh screen of 0.02% (max.), true density of the aggregate of 2.2 gm./ml. and density of 2.3 lbs./ft.$^3$ (max.), uncompressed bulk density of 2 lbs./ft.$^3$ and compressed bulk density of 4–6 lbs./ft.$^3$, pH of 3.5–4.2 (4% in water), nominal particle size of 14 millimicrons in diameter (calculated from surface area assuming spherical particles), bulking value of 5.5 gals./100 lbs., specific gravity of 2.2, silica content of >99.8% (ignited sample), refractive index of 1.46, amorphous X-ray form, and 1% ignition loss (1000° C. moisture-free basis). Maximum thickening is observed at a pH of from about 5 to 7.

It has been found that small particles of alumina-treated rutile titanium dioxide, at least in the commercial form known as "Unitane" OR-342 (a product of American Cyanamid Co.) having fine particles of about 0.1 to 1 micron (e.g., in a mean particle size range of 0.2 to 0.26 micron), did not provide a water-based sealant having better than marginal thickening and/or thixotropic flow characteristics, particularly when compared to those resulting from the use of various levels of water-washed kaolin clay (i.e., "ASP" 102) either with or without minor proportions of fumed silica (i.e., "Cab-O-Sil" M—5). Accordingly, to approach the benefits obtainable with my water-based sealant compositions, OR-342 titanium dioxide, if used therein as a compatible, thixotropic, mineral flow control agent, should be admixed or used in conjunction with another, more active agent (e.g., "ASP" 102 clay).

"Unitane" OR 342 titanium dioxide is a rutile grade product having the following typical characteristics:
  Specific Gravity: 4.2
  Solid Bulking Value (lbs./gal.): 35
  Bulking Value (gal./lb.): 0.0286
  Oil Absorption: 16–18
  Approximate pH: 7.3
  TiO$_2$ (min. %): 97
  Surface Treatment with Al$_2$O$_3$ (max. %): 3
  ASTM D-476-66: Type II
  Specifications Federal TT-P-442b: Type II The term "compatible, thixotropic, mineral flow control agent," as used herein and unless otherwise indicated, refers to dispersible mineral particles which: are of an appropriate small size, are substantially inert and are substantially insoluble under the conditions of intended use; impart desirable thixotropic flow characteristics and associated thickening to the water-based sealant during conditions of application, use, and/or setting without requiring that a separate or special, non-thixotropic thickener and/or filler also be incorporated, as such, into the sealant; do not prevent the formation of a water-based sealant having the desired stability or destroy the desired stability of any of the latex components of the water-based sealant; serve as an extender, as well as a filler, for the latex components of the sealant; and, are capable of being uniformly distributed or dispersed substantially throughout the sealant in a stable manner and form (without phase separation). The compatible, thixotropic, mineral flow control agent may consist of the same or different type(s) of appropriate mineral material(s).

Unless otherwise indicated, the term "thixotropic", as used herein with respect to the flow control agent and the sealant coposition containing an effective level of that agent, refers to a flow control agent which imparts to the sealant composition, before it has set and is ready for use in sealing container ends, enhanced thickness or body, anti-sag characteristics, and thixotropy, as evidenced by a time-dependent decreasing viscosity or shear stress at a constant shear rate, or an apparent decrease in viscosity when the sealant composition is stirred or subjected to shear at a constant or increasing rate of stirring or shearing, and an apparent or gradual increase in viscosity, back to or towards its original value, when stirring or shearing is discontinued.

Since it is desirable that the water-based sealant compositions of the invention contain at least 65% by weight of total solids and may contain, for example, up to or as much as 72.5% by weight of total solids, preferably at least 67% and as much as, for example, 70% by weight of total solids, it may be necessary or desirable to add water in formulating such sealants even though the latex components include water. When water is added, as such, UV-treated, deionized water or distilled water should be used so as to obviate or resist bacterial attack.

Like most latices, the latex components of the water-based sealant generally are susceptible to bacterial attack and associated unpleasant sharp odors and degradation, and, in advanced stages, a reduction in both viscosity and physical ability. Therefore, to protect against bacterial growth and putrefaction during shipping and normal plant storage, a bactericide (FDA-approved bactericide) generally should be incorporated into the water-based sealant. The addition of paraformaldehyde in an amount sufficient to provide 20 to 40 ppm. of that bactericide, based on the total polymeric solids present in the latex components, preferably 25 to 35 ppm. of the total polymeric solids, is adequate for most storage conditions.

The components or materials present in the finally formulated, water-based sealant composition may be admixed or blended at room temperature. The order in which those components or materials are added is of no special importance, except that if the pH of the compatible, thixotropic, mineral flow control agent should be increased, that adjustment should be effected by adjusting the pH of either or both of the aqueous latex components before adding the flow control agent thereto.

It is very desirable to prepare or formulate the water-based sealant composition in the absence of air (e.g., under a vacuum of about 26 in. of Hg), so as to obviate introducing air into the sealant when the particulate flow control agent is incorporated into the sealant and the chances of the sealant undergoing some setting, or forming undesired bubbles, voids or blisters during dispensing or after being dispensed into the peripheral groove of the container end.

Table 1, below, illustrates typical broad ranges of materials or components that may be used in formulating various water-based sealant compositions of the invention. The Brookfield viscosity of those sealants should be 2,800 to 12,000 cps. (LVF-5×,#3 spindle at 12 rpm. and 70° F.) and their pH should be 7 to 10. More particularly, the formulations depicted in Table 1 are based on using a particular acrylonitrile latex component (i.e., "Hycar" 1562×155 Latex) and butyl latex component (i.e., "Exxon" Butyl Latex 100), and particular compatible, thixotropic, mineral flow control agent, namely, "ASP" 102 aluminum silicate in the form of kaolin clay, a well as a mixture or blend of 70% by weight of that kaolin clay and 30% by weight of "Cab-O-Sil" M-5 fumed silica.

As pointed out above, the "Hycar" 1562×155 Latex component typically has 41% by weight of total solids (e.g., acrylonitrile polymer component with 38 to 39% by weight of elastomeric, high molecular weight, acrylonitrile-butadiene copolymer, and 3 to 2% by weight of other incidental or non-copolymer solids), and 59% by weight of water; whereas the particular butyl latex component, "Exxon" Butyl Latex 100, typically has 61 to 65% by weight of total solids (isobutylene polymer component), all of which consist of elastomeric, high molecular weight, isobutylene-isoprene copolymer, and 39 to 35% by weight of water. All of the liquid material in both of those particular latex components is water.

All of the solids present in the water-based sealant compositions of Table 1 total between 65 to 72.5% by weight.

Forty to fifty percent by weight of the total solids in the water-based sealants of Table 1 should be solids (acrylonitrile polymer component with its incidental or non-copolymer solids, and isobutylene polymer component) from the latex components when the flow control agent is "ASP" 102 aluminum silicate. When the mixture of 30 parts by weight of "Cab-O-Sil" M-5 fumed silica per 70 parts by weight of "ASP" 102 aluminum silicate is used, 55.56 to 62.5% by weight of the total solids in the water-based sealants of Table 1 should be solids from the latex components.

The total parts by weight of the combination of acrylonitrile latex component and butyl latex component shown in Table 1 should be 100, so that when lower prescribed values of one latex component are selected, correspondingly higher prescribed values of the other latex component are used.

TABLE 1

| | Parts by Weight | Percent by Weight of Sealant Composition |
|---|---|---|
| Acrylonitrile Latex Component with Acrylonitrile-Butadiene Copolymer | 40–60[1] | |
| 38–39% Copolymer Solids | 15.2–23.4 | |
| 3–2% Other Solids | 0.8–1.8 | |
| 59% Water | 23.6–35.4 | |
| Butyl Latex Component with Isobutylene-Isoprene Copolymer | 60–40[1] | |
| 61–65% Copolymer Solids | 39–24.4 | |
| 39–35% Water | 23.4–14 | |
| Total Solids in Latex Components | 49–55.4 | |
| When Aluminum Silicate in the Form of Kaolin Clay is Used | | 26–36.25% |
| or | | or |
| When Mixture of Said Aluminum Silicate and Fumed Silica is Used | | 36.1–45.3% |
| Total Water in Latex Components | 51–44.6 | |
| Compatible, Thixotropic, Mineral Flow Control | | |

TABLE 1-continued

|  | Parts by Weight | Percent by Weight of Sealant Composition |
|---|---|---|
| Agent |  |  |
|   Aluminum Silicate in the Form of |  |  |
|     Kaolin Clay | 49–83.1[2] | 32.5–43.5% |
|     or | or | or |
|   Mixture of Said Aluminum Silicate and Fumed Silica | 29.4–44.32[3] | 24.4–32.2% |
| Total Solids in Sealant Composition |  | 65–72.5% |
|   With Aluminum Silicate in the Form of Kaolin Clay | 98–138.5[2] |  |
|     or | or |  |
|   Mixture of Said Aluminum Silicate and Fumed Silica | 78.4–99.72[2] |  |
| Total Copolymer Solids in Sealant Composition | 47.2–54.6 |  |
| Added UV-Treated, Deionized Water | Added if necessary to provide the desired level within 27.5 to 35% by weight of total water or 65 to 72.5% by weight of total solids in the sealant composition. |  |
| Total Available Water in Sealant Composition |  | 27.5–35% |

[1]The parts by weight of the acrylonitrile latex and butyl latex components total 100.
[2]Based on 100–150 parts by weight of flow control agent per 100 parts by weight of the total solids present in both latex components (50–60% of the total solids in the sealant composition).
[3]Based on 60–80 parts by weight of the mixture of aluminum silicate and fumed silica as the flow control agent per 100 parts by weight of the total solids present in both latex components (37.5–44.44% of the total solids in the sealant composition).

It should be noted that the water-based sealant compositions of Table 1, above, embrace the presence of 65–72.5% by weight of total solids, 26–45.3% by weight of solids from the latex components, 24.4–43.5% by weight of solids from the flow control agent, and 27.5–35% by weight of water.

Table 2, below, illustrates typical preferred ranges of materials or components that may be used in formulating various water-based sealant compositions of the invention. The Brookfield viscosity of those sealants should be 6,000 to 10,000 cps. (LVF-5×, #3 spindle at 12 rpm. and 70° F.) and their pH should be 8 to 9. The formulations depicted in Table 2 are based on the use of the same materials or components referred to above with respect to Table 1.

All of the solids present in the water-based sealant compositions of Table 2 total between 67–70% by weight.

The total solids in the water-based sealants of Table 2 should consist of 43.48–45.46% by weight of solids (acryonitrile polymer component with its incidental or non-copolymr solids, and isobutylene polymer component) from the latex components when the flow control agent is "ASP" 102 aluminum silicate, and 57.14–60.61% by weight of solids from the latex components when the flow control agent is a mixture or blend of 85% by weight of "ASP" 102 aluminum silicate and 15% by weight of "Cab-O-Sil" M-5 fumed silica. The total parts by weight of the combination of the acrylonitrile latex component and butyl latex component should be 100, as described above with respect to Table 1.

TABLE 2

|  | Parts by Weight | Percent by Weight of Sealant Composition |
|---|---|---|
| Acrylonitrile Latex Component with Acrylonitrile-Butadiene Copolymer | 45–55[1] |  |
|   38–39% Copolymer Solids | 17.1–21.45 |  |
|   3–2% Other Solids | 0.9–1.65 |  |
|   59% Water | 26.55–32.45 |  |
| Butyl Latex Component with Isobutylene-Isoprene Copolymer | 55–45[1] |  |
|   61–65% Copolymer Solids | 35.75–27.45 |  |
|   39–35% Water | 21.45–15.75 |  |
| Total Solids in Latex Components | 50–54.2 |  |
|   When Aluminum Silicate in the Form of Kaolin Clay is Used |  | 29.1–31.8% |
|     or |  | or |
|   When Mixture of Said Aluminum Silicate and |  |  |

TABLE 2-continued

| | Parts by Weight | Percent by Weight of Sealant Composition |
|---|---|---|
| Fumed Silica is Used | | 38.3–42.4% |
| Total Water in Latex Components | 50–45.8 | |
| Compatible, Thixotropic, Mineral Flow Control Agent | | |
|   Aluminum Silicate in the Form of Kaolin Clay | 60–70.46[2] | 36.55–39.6% |
|   or | or | or |
|   Mixture of Said Aluminum Silicate and Fumed Silica | 32.5–40.65[3] | 26.4–30% |
| Total Solids in Sealant Composition | | 67–70% |
|   With Aluminum Silicate in the Form of Kaolin Clay | 110–124.66[2] | |
|   or | or | |
|   With Mixture of Said Aluminum Silicate and Fumed Silica | 82.5–94.85[3] | |
| Total Copolymer Solids in Sealant Composition | 48.35–53.3 | |
| Added UV-Treated, Deionized Water | Added if necessary to provide the desired level within 30 to 33% by weight of total water or 67 to 70% by weight of total solids in the sealant composition. | |
| Total Available Water in Sealant Composition | | 30–33% |

[1] The parts by weight of the acrylonitrile latex and butyl latex components total 100.
[2] Based on 120–130 parts by weight of flow control agent per 100 parts by weight of the total solids present in both latex components (54.54–56.52% of the total solids in the sealant composition).
[3] Based on 65–75 parts by weight of the mixture of aluminum silicate and fumed silica as the flow control agent per 100 parts by weight of the total solids present in both latex components (39.39–42.86% of the total solids in the sealant composition).

Table 2, above, shows water-based sealant compositions which embrace the presence of 67–70% by weight of total solids, 29.1–42.4% by weight of solids from the latex components, 26.4–39.6% by weight of solids from the flow control agent, and 30–33% by weight of water.

The Examples set forth below are for purposes of illustration only, and the products of the invention and methods for making or using them are not necessarily limited thereto.

EXAMPLE 1

A water-based sealant composition was prepared with the following materials used in the amounts indicated:

| Materials | Parts by Weight |
|---|---|
| "Exxon" Butyl Latex 100 | 301.7 |
| "Hycar" 1562X155 Latex | 452.5 |
| 26% Solution of Ammonium Hydroxide | 10.0 |
| 91% Solution of Paraformaldehyde | 0.5 |
| "ASP" 102 Clay | 929.6 |
| Added Distilled Water | 174.4 |

In preparing the sealant, the "Exxon" Butyl Latex 100 and "Hycar" 1562×155 Latex products were added to a flask equipped with a stirrer and in which they were mixed. The ammonium hydroxide solution was added with mixing. The solution of paraformaldehyde and distilled water was added with mixing. The "ASP" 102 aluminum silicate clay was added very slowly with good mixing. After all of the clay had been added, the flask was sealed and a vacuum was applied (26 inches of vacuum), and mixing was continued until all of the detectable air had been removed from the sealant. The mixing was stopped and the vacuum was released. The resultant water-based sealant was poured into a container, which was then sealed, and it was ready for use, as desired.

The foregoing water-based sealant composition had 70% by weight of total solids and 30% by weight of water solvent, and a Brookfield viscosity of 3,000 cps. (Brookfield LVF-5×, #3 spindle, 12 rpm. at 76° to 79° F.).

EXAMPLE 2

A water-based sealant composition was prepared with the following materials used in the amounts indicated:

| Materials | Parts by Weight |
|---|---|
| "Exxon" Butyl Latex 100 | 452.6 |
| "Hycar" 1562X155 Latex | 301.7 |
| 26% Solution of Ammonium Hydroxide | 10.0 |
| 91% Solution of Paraformaldehyde | 0.5 |
| "ASP" 102 Clay | 516.1 |
| Added Distilled Water | 123.5 |

The sealant was prepared in accordance with the procedure set forth in Example 1, above.

The foregoing water-based sealant composition had 68% by weight of total solids and 32% by weight of water solvent, and a Brookfield viscosity of 8,750 cps. (Brookfield LVF-5×, #3 spindle, 12 rpm. at 76° to 79° F.).

EXAMPLE 3

A water-based sealant composition was prepared with the following materials used in the amounts indicated:

| Materials | Parts by Weight |
| --- | --- |
| "Exxon" Butyl Latex 100 | 500.0 |
| "Hycar" 1562X155 Latex | 500.0 |
| 26% Solution of Ammonium Hydroxide | 7.5 |
| 91% Solution of Paraformaldehyde | 0.5 |
| "ASP" 102 Clay | 600.0 |

The sealant was prepared in accordance with the procedure set forth in Example 1, above, except that distilled water was not added.

The foregoing water-based sealant composition had 70% by weight of total solids and 30% by weight of water solvent, and a Brookfield viscosity of 5,000 cps. (Brookfield LVF-5×, #3 spindle, 12 rpm. at 76° to 79° F.).

EXAMPLE 4

A water-based sealant composition was prepared with the following materials used in the amounts indicated:

| Materials | Parts by Weight |
| --- | --- |
| "Exxon" Butyl Latex 100 | 301.7 |
| "Hycar" 1562X155 Latex | 301.7 |
| 26% Solution of Ammonium Hydroxide | 8.2 |
| 91% Solution of Paraformaldehyde | 0.5 |
| "ASP" 102 Clay | 428.0 |
| Added Distilled Water | 37.0 |

The sealant was prepared in accordance with the procedure set forth in Example 1, above.

The foregoing water-based sealant composition had 69% by weight of total solids and 31% by weight of water solvent, and a Brookfield viscosity of 7,500 cps. (Brookfield LVF-5×, #3 spindle, 12 rpm. at 76° to 79° F.).

In referring to the compatible, thixotropic, mineral flow control agent in the claims, which follow later below, the term "aluminum silicate" includes aluminum silicate in the form of clay (e.g., kaolin clay).

The foregoing detailed description has been given for clearness and understanding only, and the forms of the invention shown and described therein are to be considered only as illustrative, and no unnecessary limitations should be understood therefrom, as modifications will be obvious to those skilled in the art without departure from the spirit of the invention or the scope of the appended claims.

I claim:

1. In a container having at least one end connected and hermetically sealed to a body portion, the improvement being the use of a homogeneous, substantially solvent-free, set hermetic sealant composition substantially free of physical defects and blemishes, said sealant essentially consisting of
   (a) synthetic, elastomeric, high molecular weight, acrylonitrile-butadiene copolymer having, on a weight basis, a predominance of butadiene,
   (b) synthetic, elastomeric, high molecular weight, isobutylene-isoprene copolymer having, on a weight basis, a predominance of isobutylene, and
   (c) small particles of compatible, thixotropic, mineral flow control agent,
   the weight ratios of said acrylonitrile-butadiene copolymer, said isobutylene-isoprene copolymer, and said flow control agent being about 15.2 to 23.4::about 39 to 24.4::about 29.4 to 83.1, respectively.

2. The product of claim 1, wherein said mineral flow control agent comprises aluminum silicate.

3. The product of claim 1, wherein the mineral flow control agent comprises aluminum silicate, and said weight ratios of said acrylonitrile-butadiene copolymer, said isobutylene-isoprene copolymer, and said aluminum silicate are about 15.2 to 23.4::about 39 to 24.4::about 49 to 83.1, respectively.

4. The product of claim 1, wherein the mineral flow control agent comprises aluminum silicate, and said weight ratios of said acylonitrile-butadiene copolymer, said isobutylene-isoprene copolymer, and said aluminum silicate are about 17.1 to 21.5::about 35.8 to 27.4::about 60 to 70.5, respectively.

5. The product of claim 1, wherein said mineral flow control agent comprises a mixture of aluminum silicate and fumed silica.

6. The product of claim 1, wherein the mineral flow control agent comprises a mixture of aluminum silicate and fumed silica, and said weight ratios of said acrylonitrile-butadiene copolymer, said isobutylene-isoprene copolymer, and said mixture are about 15.2 to 23.4::about 39 to 24.4::about 29.4 to 44.3, respectively.

7. The product of claim 1, wherein the mineral flow control agent comprises a mixture of aluminum silicate and fumed silica, said weight ratios of said acrylonitrile-butadiene copolymer, said isobutylene-isoprene copolymer, and said mixture are about 17.1 to 21.5::about 35.8 to 27.4::about 32.5 to 40.7, respectively.

8. In a container having at least one end portion connected and hermetically sealed to a body portion, the improvement being the use of a homogeneous, substantially solvent-free, set hermetic sealant composition substantially free of physical defects and blemishes, said sealant essentially consisting of
   (a) synthetic, elastomeric, high molecular weight, acrylonitrile-butadiene copolymer from an acrylonitrile latex and essentially consisting of the total solids of said latex, the copolymer having about 25 to 35% by weight of acrylonitrile and about 75 to 65% by weight of butadiene,
   (b) synthetic, elastomeric, high molecular weight, isobutylene-isoprene copolymer from a butyl latex and essentially consisting of the total solids of said latex, the copolymer having about 97.7 to 98.2% by weight of isobutylene and about 2.3 to 1.8% by weight of isoprene, and
   (c) small particles of compatible, thixotropic, mineral flow control agent,
   the weight ratios of said acrylonitrile latex solids, said butyl latex solids, and said mineral flow control agent being about 16.4 to 24.6::about 39 to 24.4::about 29.4 to 83.1, respectively.

9. The product of claim 8, wherein said mineral flow control agent comprises aluminum silicate.

10. The product of claim 8, wherein the mineral control agent comprises aluminum silicate, and said weight ratios of said acrylonitrile latex solids, said butyl latex solids, and said aluminum silicate are about 16.4 to 24.6::about 39 to 24.4::about 49 to 83.1, respectively.

11. The product of claim 8, wherein the mineral flow control agent comprises aluminum silicate, and said weight ratios of said acrylonitrile latex solids, said butyl latex solids, and said aluminum silicate are about 18.4 to 22.6::about 35.8 to 27.4::about 60 to 70.5, respectively.

12. The product of claim 8, wherein said mineral flow control agent comprises a mixture of aluminum silicate and fumed silica.

13. The product of claim 8, wherein the mineral flow control agent comprises a mixture of aluminum silicate and fumed silica, and said weight ratios of said acrylonitrile latex solids, said butyl latex solids, and said mixture are about 16.4 to 24.6::about 39 to 24.4::about 29.4 to 44.3, respectively.

14. The product of claim 8, wherein the mineral flow control agent comprises a mixture of aluminum silicate and fumed silica, said weight ratios of said acrylonitrile latex solids, said butyl latex solids, and said mixture are about 18.4 to 22.6::about 35.8 to 27.4::about 32.5 to 40.7, respectively.

* * * * *